US009352966B2

(12) United States Patent
Fukunaga et al.

(10) Patent No.: US 9,352,966 B2
(45) Date of Patent: May 31, 2016

(54) METHOD FOR PRODUCING IMIDE SALT

(71) Applicant: SUMITOMO ELECTRIC INDUSTRIES, LTD., Osaka-shi, Osaka (JP)

(72) Inventors: Atsushi Fukunaga, Osaka (JP); Shinji Inazawa, Osaka (JP); Koji Nitta, Osaka (JP); Shoichiro Sakai, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 126 days.

(21) Appl. No.: 14/352,175

(22) PCT Filed: Sep. 25, 2012

(86) PCT No.: PCT/JP2012/074552
§ 371 (c)(1),
(2) Date: Apr. 16, 2014

(87) PCT Pub. No.: WO2013/058069
PCT Pub. Date: Apr. 25, 2013

(65) Prior Publication Data
US 2014/0241973 A1   Aug. 28, 2014

(30) Foreign Application Priority Data
Oct. 18, 2011   (JP) .................................. 2011-229128

(51) Int. Cl.
*C01B 21/086*   (2006.01)
*C01D 13/00*   (2006.01)

(52) U.S. Cl.
CPC .............. *C01B 21/086* (2013.01); *C01D 13/00* (2013.01)

(58) Field of Classification Search
USPC ......................................................... 423/386
See application file for complete search history.

(56) References Cited

U.S. PATENT DOCUMENTS 8,134,027 B2 * 3/2012 Okumura .............. C07C 303/40
564/83
2001/0021790 A1   9/2001 Yonezawa et al.
2011/0034716 A1 * 2/2011 Okumura .............. C07C 303/40
556/69
2012/0070358 A1   3/2012 Morinaka et al.

FOREIGN PATENT DOCUMENTS

| CN | 101747242 A | 6/2010 |
| CN | 102046523 A | 5/2011 |
| JP | 2001-288193 A | 10/2001 |
| JP | 2010-189372 A | 9/2010 |

(Continued)

OTHER PUBLICATIONS

Machine Translation of WO2010010613 A1.*

(Continued)

*Primary Examiner* — Anthony J Zimmer
(74) *Attorney, Agent, or Firm* — Ditthavong & Steiner, P.C.

(57) ABSTRACT

A mixture of sulphamic acid, a halogenated sulphonic acid and thionyl chloride is heated to allow the reaction to proceed, to thereby produce first intermediate products. The first intermediate products are then subjected to reaction with an alkali metal fluoride MF to produce second intermediate products. The second intermediate products is then subjected to reaction with the alkali metal fluoride MF in a polar solvent to obtain a desired product $MN(SO_2F)_2$ (where M is an alkali metal).

6 Claims, 1 Drawing Sheet

(56) References Cited

FOREIGN PATENT DOCUMENTS

| WO | 2010/010613 A1 | 1/2010 |
|---|---|---|
| WO | 2010/140580 A1 | 12/2010 |

OTHER PUBLICATIONS

International Preliminary Report on Patentability and Translation of Written Opinion for corresponding International Application No. PCT/JP2012/074552, dated Apr. 22, 2014, 5 pages.

Chinese Office Action for related Chinese Patent Application No. 201280050861.X dated Feb. 2, 2015, 7 pages.
International Search Report for corresponding International Application No. PCT/JP2012/074552, dated Dec. 4, 2012, 2 pages.
Martin Beran et al., "A New Method of the Preparation of Imido-bis(sulfuric acid) Dihalogenide, (F,Cl), and the Potassium Salt of Imido-bis(sulfuric acid) Difluoride," Z. Anorg. Allg. Chem., 2005, pp. 55-59, vol. 631.

\* cited by examiner

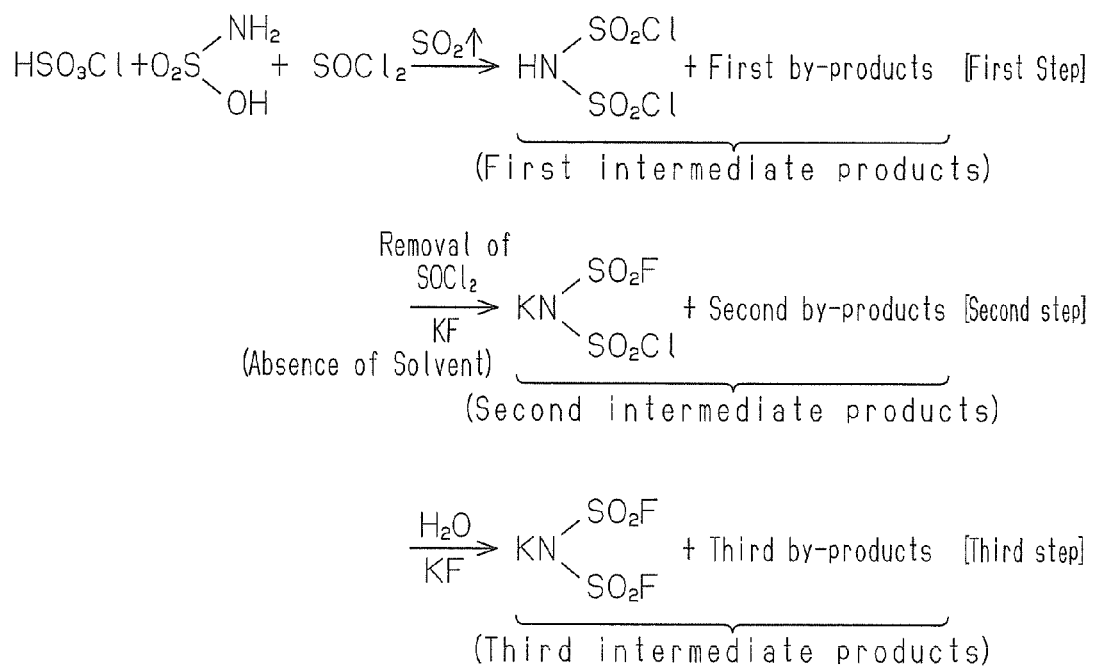

METHOD FOR PRODUCING IMIDE SALT

FIELD OF THE INVENTION

The present invention relates to a method for producing an imide salt.

BACKGROUND OF THE INVENTION

In recent years, imide salts such as $LiN(SO_2F)_2$ have been attracting attention as supporting salts added to electrolytes used for lithium ion secondary batteries. $KN(SO_2F)_2$ or $NaN(SO_2F)_2$, or mixtures thereof have also been attracting attention as electrolytes for molten salt batteries.

Methods for producing $KN(SO_2F)_2$ and $KN(SO_2F)_2$ are disclosed in the following reference. In Non Patent Literature 1, urea and fluorosulphonic acid are subjected to reaction to produce $HN(SO_2Cl)_2$ which is then subjected to reaction with KF in a nitromethane or dichloromethane solvent to obtain $KN(SO_2F)_2$.

Meanwhile, there is a need for a simplified production method of imide salts typically including $LiN(SO_2F)_2$, $KN(SO_2F)_2$, $NaN(SO_2F)_2$ and the like compared to conventional methods. This is because the conventional production methods require many steps for obtaining desired products from raw materials and also are time consuming due to the lengthy fluorination reaction.

Non Patent Literature 1: Z. Anorg. Allg. Chem, 2005, 631, p. 55-59

DISCLOSURE OF THE INVENTION

An object of the present invention is to provide a method for producing an imide salt which allows simple production of the imide salt.

In order to solve the above problem, the first aspect of the present invention provides a method for producing an imide salt represented by $MN(SO_2F)_2$ (where M is an alkali metal). The method includes a first step of producing first intermediate products by heating a mixture of sulphamic acid, a halogenated sulphonic acid and thionyl chloride to allow the reaction to proceed; a second step of producing second intermediate products by adding, in the absence of solvent, an alkali metal fluoride MF to the first intermediate products from which unreacted thionyl chloride has been removed to allow the reaction to proceed; and a third step of producing the imide salt by subjecting the second intermediate products to reaction with the alkali metal fluoride MF in a polar solvent.

In conventional production methods, alkali metal salts of imides can be obtained by reaction in a solvent such as dichloromethane of $HN(SO_2X^1)(SO_2X^2)$ (wherein $X^1$ and $X^2$ independently represent a halogen element; the same applies hereinafter) with an alkali metal fluoride MF. However, the reaction is slow because the alkali metal fluoride MF is practically insoluble in dichloromethane, so that the concentration of the alkali metal fluoride MF cannot be increased.

Meanwhile, in order to increase the rate of the reaction of $HN(SO_2X^1)(SO_2X^2)$ with an alkali metal fluoride, the reaction may be carried out in a solvent which has high solubility for the alkali metal fluoride. However, it has been confirmed that the rate of the reaction is not increased even when the reaction is carried out in acetonitrile, a solvent for an alkali metal fluoride. Water may also be used as a solvent as an alkali metal fluoride is very soluble in water. However, using water as a solvent is difficult because $HN(SO_2Cl)_2$ hydrolyses.

Taking the above into account, the present inventors have carried out extensive studies and found the following:

First, a mixture of sulphamic acid, a halogenated sulphonic acid and thionyl chloride is heated to allow the reaction to proceed and obtain first intermediate products. The first intermediate products contain $HN(SO_2X^1)(SO_2X^2)$. A conventional way for obtaining a desired product $MN(SO_2F)_2$ from the first intermediate products may be an isolation of $HN(SO_2X^1)(SO_2X^2)$ from the first intermediate products. However, in the present invention, $HN(SO_2X^1)(SO_2X^2)$ is not isolated and alternatively, thionyl chloride and the like remaining in the first intermediate products are removed before the next step. The present inventors have found that even with this manner, the yield of the desired product is scarcely decreased.

Second, it has been found that the reaction of the first intermediate products containing $HN(SO_2X^1)(SO_2X^2)$ with the alkali metal fluoride MF in the absence of solvent allows substitution of one of the halogen elements to fluorine and completion of the reaction in a short time. Reaction in the absence of solvent as used herein means reaction without solvent such as dichloromethane which is otherwise used in the conventional art.

Third, it has been found that the reaction of the second intermediate products obtained in the second step with the alkali metal fluoride MF in a polar solvent allows the desired product $MN(SO_2F)_2$ and reduction in the reaction time of the synthetic method compared to the conventional synthetic methods.

By taking the above into account, the present invention comprising the following steps allows production of a desired product. Namely, sulphamic acid, a halogenated sulphonic acid and thionyl chloride are subjected to reaction to produce first intermediate products. To the first intermediate products from which unreacted thionyl chloride has been removed is then added an alkali metal fluoride MF before addition of a polar solvent, thereby obtaining a desired product $MN(SO_2F)_2$. According to the method, the desired product can be obtained in a simple manner with reduced time compared to the conventional manners.

Because the method is devoid of isolation of $HN(SO_2X^1)(SO_2X^2)$ from the first intermediate products in the first step, distillation facilities for isolation of $HN(SO_2X^1)(SO_2X^2)$ are not required in an industrial point of view. Thus the method allows a simple production of the desired product.

In the second step, one of the halogen elements in $HN(SO_2X^1)(SO_2X^2)$ contained in the first intermediate products is substituted by fluorine and the other halogen element is substituted by fluorine in the third step. Fluorination of halogen elements in two steps can provide the following effects. Thus, $HN(SO_2X^1)(SO_2X^2)$ is converted to an alkali metal salt in the second step to eliminate $HN(SO_2X^1)(SO_2X^2)$ which may hydrolyze. This allows use of water in which the alkali metal fluoride MF is very soluble in the third step. Namely, fluorination of $HN(SO_2X^1)(SO_2X^2)$ with the alkali metal fluoride MF in two steps as described above instead of in a certain solvent allows prevention of hydrolysis of $HN(SO_2X^1)(SO_2X^2)$ and reduction in time required for fluorination of $HN(SO_2X^1)(SO_2X^2)$.

In the method for producing an imide salt, the amount of the alkali metal fluoride MF subjected to the reaction in the second step is preferably in excess to the amount of the first intermediate products in terms of molar amount.

In the second step, the amount of the alkali metal fluoride added is in excess to the amount of the first intermediate products in terms of molar amount. Most of the intermediate product $(HN(SO_2X^1)(SO_2X^2))$ obtained from the starting sulphamic acid can be thereby fluorinated. Accordingly, the amount of unreacted $HN(SO_2X^1)(SO_2X^2)$ can be reduced and the yield of the desired product can be increased.

In the method for producing an imide salt, the imide salt is preferably isolated by solvent extraction from a dried substance obtained by removing the polar solvent from third intermediate products obtained in the third step.

The imide salt represented by $MN(SO_2F)_2$ has a solubility in certain solvents that is different from that of the salts and acids, which are intermediate products. Thus the desired product $MN(SO_2F)_2$ is isolated from the intermediate products by solvent extraction.

In the method for producing an imide salt, moisture is removed from the alkali metal fluoride MF prior to the reaction of the first intermediate products with the alkali metal fluoride MF.

$HN(SO_2X^1)(SO_2X^2)$ hydrolyzes due to the reaction with water to produce a by-product. According to the present invention, moisture is removed from the alkali metal fluoride MF, resulting in reduction in generation of the by-product due to hydrolysis.

In the method for producing an imide salt, the polar solvent is preferably a protic polar solvent.

The alkali metal fluoride MF has a higher solubility in protic polar solvents than in aprotic polar solvents. According to the present invention, the reaction of the second intermediate products with the alkali metal fluoride MF can be facilitated.

In the method for producing an imide salt, the second step is preferably carried out after generation of gas is ceased in the first step.

In the first step, sulphur dioxide is produced from the reaction of thionyl chloride with sulphamic acid. Thus cessation of generation of sulphur dioxide indicates completion of the reaction of sulphamic acid. According to the present invention, transfer to the next step is indicated by cessation of generation of sulphur dioxide. Thereby the amount of unreacted sulphamic acid can be reduced, resulting in an increase in the yield.

BRIEF DESCRIPTION OF THE DRAWING

FIG. 1 is a scheme of production of $KN(SO_2F)_2$ in which intermediate products in respective steps are shown.

DETAILED DESCRIPTION OF THE PREFERRED EMBODIMENTS

The method for producing $KN(SO_2F)_2$ is described by referring to FIG. 1.

In the first step, thionyl chloride ($SOCl_2$) is mixed with sulphamic acid ($NH_2$—$SO_2OH$) and chlorosulphonic acid ($HSO_3Cl$) in order to allow the reaction to proceed. Thionyl chloride ($SOCl_2$) acts as a chlorine donor to sulphamic acid ($NH_2$—$SO_2OH$). This reaction gives the first intermediate products. The first intermediate products contain $HN(SO_2Cl)_2$.

Products from the first step include $HN(SO_2Cl)_2$ as well as by-products such as sulphur dioxide, hydrochloric acid, sulphuric acid and nitric acid. The amount of nitric acid produced is significantly less than the amounts of hydrochloric acid and sulphuric acid produced. Thus most of sulphamic acid may be converted to $HN(SO_2Cl)_2$. The substances other than $HN(SO_2Cl)_2$ in the first intermediate products are herein referred to as first by-products. The first by-products include unreacted and remaining thionyl chloride and the like.

In the second step, to the first intermediate products from which excess thionyl chloride has been removed is added potassium fluoride (KF) in order to allow the reaction to proceed. Thereby $KN(SO_2F)(SO_2Cl)$ is obtained. In this reaction, one of the chlorine atoms in $HN(SO_2Cl)(SO_2Cl)$ is substituted by fluorine, while the other chlorine is not. Sulphuric acid, hydrochloric acid and nitric acid react with potassium fluoride to form salts. The amount of potassium fluoride is in excess to the amount of the first intermediate products in terms of molar amount. The products from the second step are referred to as the second intermediate products, and the substances other than $KN(SO_2F)(SO_2Cl)$ in the second intermediate products are referred to as second by-products.

In the third step, to the second intermediate products was added water and reaction of $KN(SO_2F)(SO_2Cl)$ with potassium fluoride (KF) is allowed to proceed to produce $KN(SO_2F)_2$. The products from the third step are referred to as the third intermediate products, and the substances other than $KN(SO_2F)(SO_2Cl)$ in the third intermediate products are referred to as third by-products.

Example 1

First Step

Sulphamic acid, chlorosulphonic acid and thionyl chloride are mixed in an inert atmosphere at a molar ratio of 1.0:1.0:2.4 and heated under reflux. The temperature is 130° C.

The reaction of sulphamic acid with chlorosulphonic acid and thionyl chloride gives $HN(SO_2Cl)_2$. This reaction also provides by-products including sulphur dioxide, sulphuric acid and hydrochloric acid. Sulphur dioxide is generated from the reaction of thionyl chloride with sulphamic acid. Thus generation of sulphur dioxide indicates continuation of the reaction. Thus the heating is continued until generation of sulphur dioxide is ceased.

After completion of the reaction, a calcium chloride tube is attached to a vapour outlet of the reaction system with care so that moisture is not introduced into the reaction system, and the whole reaction system is cooled. Thereby hydrolysis of $HN(SO_2Cl)_2$ due to introduction of moisture is prevented.

Second Step

The first intermediate products are left to stand under reduced pressure (650 Pa or less) for a predetermined time to remove thionyl chloride ($SOCl_2$) from the first intermediate products. This step is carried out because of the following reason. Thionyl chloride ($SOCl_2$) vigorously reacts with water, while water needs to be added in the subsequent step. The remaining thionyl chloride ($SOCl_2$) prevents control of the whole reaction system due to the reaction thereof with water. The intermediate products (hereinafter referred to as intermediate products A) which correspond to the first intermediate products from which excess thionyl chloride has been removed are subjected to reaction with potassium fluoride (KF) in the absence of solvent. Specifically, the intermediate products A are added dropwise to potassium fluoride (KF) powder which has been previously dried in order to carry out the reaction. Upon the addition, potassium fluoride (KF) reacts with $HN(SO_2Cl)_2$ to produce $KN(SO_2F)(SO_2Cl)$. HCl is generated as a by-product. The reaction is completed when generation of HCl is ceased or generation of heat is ceased.

The reaction of potassium fluoride (KF) with the intermediate products A may be carried out in the presence of solvent. However, water cannot be used as a solvent because of hydrolysis of $HN(SO_2Cl)_2$. Polar solvents other than water may be used, however potassium fluoride (KF) has a low solubility in polar solvents other than water, resulting in a reduced rate of reaction of potassium fluoride (KF) with the first intermediate products. The above method thus allows the reaction at a high rate because the reaction of potassium fluoride (KF) with the first intermediate products is carried out in the absence of solvent.

The amount of potassium fluoride (KF) is in excess to the amount of the intermediate products A in terms of molar amount. Alternatively, the amount of potassium fluoride (KF) may be determined as follows. Thus, the amount of potassium fluoride (KF) to be added is the amount sufficient for converting almost the whole amount of $HN(SO_2Cl)_2$ to $KN(SO_2F)_2$ and converting almost the whole amount of by-products, sulphuric acid and hydrochloric acid, to salts.

The amount of potassium fluoride is in large excess by taking the reaction in the third step into account. Namely, the amount of potassium fluoride (KF) added is determined by taking the amount of potassium fluoride to be dissolved in water in the third step into account. Accordingly, a repeated addition of potassium fluoride (KF) in the third step can be avoided.

Third Step

In the third step, water is added to the second intermediate products in order to allow the reaction of $KN(SO_2F)(SO_2Cl)$ with potassium fluoride (KF) to proceed. The solution is then stirred at room temperature for 12 hours. The solution may be stirred at a temperature at or above room temperature. This process allows production of $KN(SO_2F)_2$.

Fourth Step

In the fourth step, $KN(SO_2F)_2$ is extracted from the third intermediate products obtained in the third step. Specifically, the third intermediate products are subjected to reduced pressure and water is removed. Accordingly, mixed powder (dried substance) of potassium fluoride (KF), potassium chloride (KCl), potassium sulphate ($K_2SO_4$), potassium nitrate ($KNO_3$) and $KN(SO_2F)_2$ is obtained.

These salts are then dissolved in ethanol. To the solution is further added dichloromethane or hexane to obtain a mixed solution. Potassium fluoride (KF), potassium chloride (KCl), potassium sulphate ($K_2SO_4$) and potassium nitrate ($KNO_3$) dissolve in the mixed solution while $KN(SO_2F)_2$ does not. Thus $KN(SO_2F)_2$ is precipitated from the mixed solution. The mixed solution is filtered or centrifuged to separate $KN(SO_2F)_2$. $KN(SO_2F)_2$ may also be extracted by column chromatography.

The yield of $KN(SO_2F)_2$ obtained by the above procedures was 90% on the basis of sulphamic acid. The product obtained in the fourth step was dissolved in water and analyzed by $^{19}F$-NMR to determine the yield. The product obtained in the fourth step was analyzed by ion chromatography resulting in $F^-$ being 0.17 ppm, $Cl^-$ being less than 0.1 ppm, $SO_4^{2-}$ being 0.19 ppm and $K^+$ being 1.5 ppm. Accordingly it was confirmed that the above production method gave $KN(SO_2F)_2$.

Example 2

The method for producing $KN(SO_2F)_2$ from sulphamic acid, fluorosulphonic acid and thionyl chloride, which are starting materials, is described.

In Example 2, fluorosulphonic acid was used in place of chlorosulphonic acid in Example 1.

In the first step, sulphamic acid, fluorosulphonic acid and thionyl chloride are subjected to reaction which gives $HN(SO_2Cl)(SO_2F)$. Namely, the substance which is produced during the process of the second step in Example 1 is obtained in this step. This may be due to sulphonation reaction with fluorosulphonic acid of an intermediate obtained by substitution of the OH group in sulphamic acid with chlorine.

In the second step, to the first intermediate products obtained in the first step from which excess thionyl chloride has been removed is added potassium fluoride (KF) to allow the reaction to proceed. Thereby almost the whole amount of by-products, namely sulphuric acid and hydrochloric acid is converted to salts.

In the third step, water is added to the second intermediate products from the second step. Thereby $KN(SO_2F)_2$ is produced. In the fourth step, $KN(SO_2F)_2$ is extracted from the third intermediate products from the third step.

<Production of $MN(SO_2F)_2$>

In order to obtain $MN(SO_2F)_2$ (where M is an alkali metal) other than $KN(SO_2F)_2$, the alkali metal fluoride added in the second step is a metal fluoride corresponding to the desired product. Specifically, in order to obtain $LiN(SO_2F)_2$, LiF is used. In order to obtain $NaN(SO_2F)_2$, NaF is used. In order to obtain $RbN(SO_2F)_2$, RbF is used. In order to obtain $CsN(SO_2F)_2$, CsF is used.

The method for producing $MN(SO_2F)_2$ is the same as Example 1. Thus the first to fourth steps allow production of $MN(SO_2F)_2$. In production of $MN(SO_2F)_2$, fluorosulphonic acid ($HSO_3F$) may be used in place of chlorosulphonic acid ($HSO_3Cl$) in the first step.

Accordingly, the present embodiments provide the following effects.

(1) A mixture of sulphamic acid, a halogenated sulphonic acid and thionyl chloride is heated. To the first intermediate products obtained in the first step from which excess thionyl chloride has been removed is then added an alkali metal fluoride MF in order to allow the reaction to proceed. The reaction of the second intermediate products obtained in the second step with water is then carried out. Thereby $MN(SO_2F)_2$ (where M is an alkali metal) is obtained. This method allows synthesis of $MN(SO_2F)_2$ in a reduced time compared to the conventional methods.

(2) The amount of the alkali metal fluoride MF subjected to the reaction in the second step is in excess to the amount of the first intermediate products in terms of molar amount. Thereby the amount of unreacted $HN(SO_2X^1)(SO_2X^2)$ can be reduced and the yield of the desired product can be increased.

(3) Water is removed from the third intermediate products obtained in the third step to obtain a dried substance, which is then subjected to solvent extraction to isolate the desired product from the dried substance. The solvent used for solvent extraction is ethanol and dichloromethane. Ethanol and hexane may also be used alternatively. $MN(SO_2F)_2$ is practically insoluble in ethanol, dichloromethane and hexane, while the third intermediate products other than $MN(SO_2F)_2$, i.e. potassium sulphate, potassium chloride, potassium fluoride and the like are soluble in either of ethanol and dichloromethane or either of ethanol and hexane. By utilizing the difference in solubility, the desired product $MN(SO_2F)_2$ can be extracted.

(4) Moisture is removed from the alkali metal fluoride (MF) prior to the reaction of the first intermediate products with the alkali metal fluoride (MF). This process which removes moisture prevents hydrolysis of $HN(SO_2X^1)(SO_2X^2)$ due to the reaction thereof with water.

(5) In the third step, water is used which is a protic polar solvent in order to further facilitate the reaction of the dried substance of the second intermediate products with the alkali metal fluoride (MF). The alkali metal fluoride MF is more soluble in protic polar solvents than in aprotic polar solvents. Thus the reaction of $MN(SO_2X^1)(SO_2F)$ with the alkali metal fluoride MF can be facilitated.

(6) The second step is carried out after generation of gas in the first step is ceased. In the first step, the reaction of thionyl chloride with sulphamic acid generates sulphur dioxide. Because cessation of generation of sulphur dioxide indicates the transfer to the next step, the amount of unreacted sulphamic acid can be reduced. Generation of gas and cessation of generation of gas can be confirmed with a manometer or a flowmeter.

The present embodiments may be modified as follows.

In the above embodiments, water is used in the third step which is a protic polar solvent. However, any solvent may be used as long as it dissolves the alkali metal fluoride MF and $MN(SO_2X^1)(SO_2F)$. For example, ethanol, acetonitrile and the like can be used in place of water.

In the above embodiments, thionyl chloride ($SOCl_2$), sulphamic acid ($NH_2$—$SO_2OH$) and chlorosulphonic acid ($HSO_3Cl$) were mixed to allow the reaction to proceed in the first step. However, these reactants may be mixed stepwise. For example, sulphamic acid ($NH_2$—$SO_2OH$) is first mixed with thionyl chloride ($SOCl_2$). After the sufficient reaction of the compounds is carried out, chlorosulphonic acid ($HSO_3Cl$) is mixed thereto and subjected to heating. According to this procedure, the desired product of the first step, $HN(SO_2Cl)_2$ can also be obtained.

The invention claimed is:

1. A method for producing an imide salt represented by $MN(SO_2F)_2$, where M is an alkali metal, comprising:
    a first step of producing first intermediate products, which contain $HN(SO_2Cl)_2$ by heating a mixture of sulphamic acid, a halogenated sulphonic acid and thionyl chloride to allow reaction to proceed;
    a second step of producing second intermediate products, which contain $KN(SO_2F)(SO_2Cl)$, by adding, in the absence of solvent, an alkali metal fluoride MF to the first intermediate products from which unreacted thionyl chloride has been removed to allow reaction to proceed; and
    a third step of producing the imide salt by subjecting the second intermediate products to reaction with the alkali metal fluoride MF in a polar solvent.

2. The method for producing an imide salt according to claim 1, wherein:
    an amount of the alkali metal fluoride MF subjected to the reaction in the second step is in excess to an amount of the first intermediate products in terms of molar amount.

3. The method for producing an imide salt according to claim 1, wherein:
    the imide salt is isolated by solvent extraction from a dried substance obtained by removing the polar solvent from third intermediate products obtained in the third step.

4. The method for producing an imide salt according to claim 1, wherein:
    moisture is removed from the alkali metal fluoride MF prior to the reaction of the first intermediate products with the alkali metal fluoride MF.

5. The method for producing an imide salt according to claim 1, wherein:
    the polar solvent is a protic polar solvent.

6. The method for producing an imide salt according to claim 1, wherein:
    the second step is carried out after generation of gas is ceased in the first step.

* * * * *